United States Patent
Saygivar et al.

(10) Patent No.: US 11,383,632 B2
(45) Date of Patent: Jul. 12, 2022

(54) TENSIONING APPARATUS FOR STRAPS AND METHOD OF USING THE TENSIONING APPARATUS

(71) Applicants: Fiona Gabriella Saygivar, Rostrevor (GB); Sharon Naomi Saygivar, Rostrevor (GB); Lisa Marie Saygivar, Rostrevor (GB)

(72) Inventors: Fiona Gabriella Saygivar, Rostrevor (GB); Sharon Naomi Saygivar, Rostrevor (GB); Lisa Marie Saygivar, Rostrevor (GB)

( * ) Notice: Subject to any disclaimer, the term of this patent is extended or adjusted under 35 U.S.C. 154(b) by 0 days.

(21) Appl. No.: 16/783,220

(22) Filed: Feb. 6, 2020

(65) Prior Publication Data

US 2020/0247305 A1   Aug. 6, 2020

(30) Foreign Application Priority Data

Feb. 6, 2019   (DE) .......................... 102019102914.7
Apr. 24, 2019  (DE) .......................... 102019110559.5

(51) Int. Cl.
*B60P 7/08* (2006.01)
*B65H 23/04* (2006.01)

(52) U.S. Cl.
CPC .......... *B60P 7/0823* (2013.01); *B65H 23/048* (2013.01); *B65H 2402/64* (2013.01); *B65H 2404/255* (2013.01)

(58) Field of Classification Search
CPC ....... B60P 7/0869; B60P 7/0861; B60P 7/083; Y10T 24/1416; Y10T 24/21; Y10T 24/2175; Y10T 24/2187; Y10S 24/909
See application file for complete search history.

(56) References Cited

U.S. PATENT DOCUMENTS

| | | | | |
|---|---|---|---|---|
| 3,998,429 A * | 12/1976 | Cheung | ..................... | F16H 7/08 |
| | | | | 254/218 |
| 4,542,883 A | 9/1985 | Rutzki | | |
| 7,510,168 B1 * | 3/2009 | Lin | ....................... | B65B 13/025 |
| | | | | 24/68 CD |
| 8,424,846 B1 * | 4/2013 | Perduta | .................... | B66D 3/14 |
| | | | | 254/243 |
| 2007/0289112 A1 | 12/2007 | Kaczorowski | | |
| 2008/0104811 A1 * | 5/2008 | Burrows | ................ | B60P 7/083 |
| | | | | 24/68 CD |
| 2008/0201922 A1 | 8/2008 | Ruan | | |
| 2009/0224219 A1 | 9/2009 | Woodruff | | |
| 2010/0322737 A1 | 12/2010 | Huang | | |

FOREIGN PATENT DOCUMENTS

| | | |
|---|---|---|
| DE | 29503083 U1 | 5/1995 |
| DE | 102006044024 B3 | 3/2008 |
| DE | 102009055740 A1 | 6/2011 |

* cited by examiner

*Primary Examiner* — Robert Sandy
*Assistant Examiner* — Michael S Lee
(74) *Attorney, Agent, or Firm* — Laurence A. Greenberg; Werner H. Stemer; Ralph E. Locher (57) ABSTRACT

A tensioning apparatus tensions straps, and in particular is configured to tension belts. In order to achieve good tensioning characteristics, the tensioning apparatus has a dynamically acting element, and by use of the dynamically acting element a transmission of force takes place indirectly in the case of the tensioning apparatus.

12 Claims, 6 Drawing Sheets

TENSIONING APPARATUS FOR STRAPS AND METHOD OF USING THE TENSIONING APPARATUS

CROSS-REFERENCE TO RELATED APPLICATION

This application claims the priority, under 35 U.S.C. § 119, of German applications DE 10 2019 102 914, filed Feb. 6, 2019 and DE 10 2019 110 559, filed Apr. 24, 2019; the prior applications are herewith incorporated by reference in its entireties.

BACKGROUND OF THE INVENTION

Field of the Invention

The invention relates to a tensioning apparatus for straps, in particular for belts. In particular, the invention relates to a force-dependent belt tensioning apparatus.

Belt tensioning systems having a tensioning apparatus for belts are used mainly for load securing or as reusable temporary fasteners for machines, pallets or the like.

Most of the tensioning systems on the market nowadays are based on the principle that a belt strap which is anchored fixedly at at least two stationary fixed points shortens the strap length in stages via a driving mechanism by use of a mechanical winding system, and is at the same time secured against being retracted. Here, the tension of the belt strap is increased continuously in the case of a resistance being achieved. This method has proven to be expedient in practice.

The disadvantages of the tensioning systems consist, however, in that there is fundamentally no possibility for it to be possible for a required or desired tension of the belt strap to be aimed for or even to be guaranteed.

The tensioning force of the tensioning systems is fundamentally always dependent on the individual effort of the person carrying out the tensioning operation.

For this reason, there is always the possibility for a belt strap to be tensioned more or less than aimed for or stipulated.

An inspection of the actually achieved belt tension can be checked only subsequently by way of measuring tools which are configured specifically for this purpose.

SUMMARY OF THE INVENTION

The invention is based on the object of providing an improved tensioning apparatus for straps, in particular for belts.

The object is achieved by way of a tensioning apparatus for straps, in particular for belts, which tensioning apparatus has a dynamically acting element according to the invention, by which a transmission of force takes place indirectly in the case of the tensioning apparatus.

That is to say, the dynamically acting element is set up for the indirect transmission of force.

In the case of the transmission of force, a force which is generated by a user is preferably transmitted.

In the case of an indirect transmission of force, the generated force of the user is expediently introduced into the tensioning apparatus in a non-direct manner, for example via a tensioning lever. In relation to the tensioning lever, the transmission of force of the user namely takes place indirectly, that is to say not via the tensioning lever, but rather via a dynamically acting element.

That is to say, it is not the tensioning lever in this case but rather the dynamically acting element which serves as force-transmitting member.

A system can thus be provided by way of the tensioning apparatus, which system preferably blocks automatically and at the same time prevents further tensioning (excessive tensioning) in the case of the minimum required tensioning force of a strap, in particular of a belt, being achieved.

Moreover, all the advantages of a conventional tensioning apparatus can be utilized, in particular.

It is advantageous if the tensioning apparatus has a coupling. The tensioning apparatus is expediently set up to transmit a force to the coupling indirectly via the dynamically acting element.

Furthermore, it is advantageous if the tensioning apparatus has a rotational element which is connected to the coupling. The tensioning apparatus is expediently set up to transmit a force to the coupling indirectly via the dynamically acting element, with the result that the rotational element is rotated, in particular in order to tension a strap.

It is preferred if the rotational element has at least one rod-shaped element. The rod-shaped element can be, for example, a bolt, in particular a connecting bolt. For example, the rotational element can have two rod-shaped elements, in particular bolts.

The rod-shaped elements of the rotational element can preferably be rotated about one another. In principle, the rotational element can also be of different configuration.

It is expedient if the dynamically acting element can be bent and/or twisted under the transmission of force.

That is to say, the dynamically acting element which, for example, expediently bends ("bending element") and/or twists ("torsion element") in a "dynamically acting" manner in the case of a transmission of force serves as force-transmitting member.

In particular, the dynamically acting element can have a force-dependent bend and/or twist. That is to say, the dynamically acting element can be bent and/or twisted in a manner which is dependent on the force which acts on the element. In particular, the degree of the bend and/or twist can be dependent on the force which acts on the element.

It is preferred if the tensioning apparatus has a locking mechanism.

The locking mechanism is expediently set up to lock the tensioning apparatus in a manner which is dependent on the force which is transmitted by means of the dynamically acting element. That is to say, the locking mechanism preferably acts in a force-dependent manner.

In particular, the locking mechanism can be set up to lock the tensioning apparatus in the case of a predefined force which is transmitted by the dynamically acting element.

For example, the locking mechanism can be set up to lock the tensioning apparatus in the case of a predefined bend and/or twist of the dynamically acting element.

In this way, the geometric difference which is produced by way of the bending/twisting of the dynamically acting element in relation to the tensioning apparatus can lead above a predefined value to the automatic locking of the tensioning apparatus.

By way of the tensioning apparatus, a system can thus be produced that, in the case of the minimum required tensioning force of a strap, in particular of a belt, being reached, blocks automatically and at the same time prevents further tensioning (excessive tensioning). In particular, the tensioning apparatus can be locked autonomously independently of the user in the case of the envisaged belt tension being reached.

By way of the tensioning apparatus, furthermore, autonomous turning backward of the tensioning apparatus under load can be prevented mechanically, and the achieved tensioning force of the strap or the belt can be ensured in the long term.

It is advantageous if the tensioning apparatus is set up such that the transmission of force up to the locking of the tensioning apparatus takes place by means of the dynamically acting element, that is to say indirectly. That is to say, the transmission of force up to the locking of the tensioning apparatus preferably takes place by the dynamically acting element, that is to say indirectly.

In one advantageous refinement of the invention, the locking mechanism for locking the tensioning apparatus contains a locking step which is set up for blocking of the tensioning apparatus in a form locking manner. That is to say, the locking step is preferably set up to block the tensioning apparatus in a form locking manner.

In this way, an unintentional or accidental release of the tensioning apparatus can be avoided/prevented. In this way, furthermore, a release and/or further tensioning can be prevented in a form locking manner by way of the user.

The tensioning apparatus expediently contains a tensioning lever.

The tensioning lever is preferably in neutral in the case of the indirect transmission of force by the dynamically acting element. A tensioning lever which is in neutral expediently does not transmit any force. The tensioning lever is preferably mounted such that it can be rotated about the coupling in neutral, without transmitting a force, in particular to the coupling.

In this way, an indirect transmission of force can be ensured.

The tensioning lever is preferably in neutral up to the locking of the tensioning apparatus. That is to say, the tensioning lever preferably does not transmit any force up to the locking of the tensioning apparatus.

It can be made possible in this way that the transmission of force up to the locking of the tensioning apparatus takes place only via the dynamically acting element, that is to say indirectly.

In one preferred refinement of the invention, the locking mechanism for locking the tensioning apparatus contains two locking steps. One of the two locking steps can be the abovementioned locking step.

The tensioning lever is preferably set up for the form locking transmission of force between the two locking steps of the locking mechanism. That is to say, the tensioning lever is preferably set up to transmit a force between the two locking steps under a form locking connection, in particular to the coupling. The (form locking) transmission of force by means of the tensioning lever can be regarded as a direct transmission of force.

The dynamically acting element can be, for example, a spring rod. Furthermore, the dynamically acting element can be a leg spring. Furthermore, the dynamically acting element can be a torsion spring. Moreover, the dynamically acting element can be, for example, a torsion element.

Furthermore, the invention is directed to the use of the abovementioned tensioning apparatus and/or one of its developments for tensioning a strap, in particular a belt.

A strap is preferably inserted or has been inserted into the tensioning apparatus in such a way that the strap bears at least against the rotational element of the tensioning apparatus. For example, the strap can be/have been inserted into the tensioning apparatus in such a way that the strap is/has been guided through the rotational element of the tensioning apparatus.

The rotational element which is mentioned in conjunction with the use is preferably the abovementioned rotational element of the tensioning apparatus.

Furthermore, it is preferred if a force is transmitted indirectly via the dynamically acting element to a coupling of the tensioning apparatus, with the result that the rotational element which is connected to the coupling is rotated, the strap being tensioned in the case of the rotational movement of the rotational element.

It is preferred if the coupling which is mentioned in conjunction with the use is the abovementioned coupling. Furthermore, it is preferred if the rotational element which is mentioned in conjunction with the use is the abovementioned rotational element.

The dynamically acting element is preferably bent and/or twisted in a manner which is dependent on the force which acts on the element.

Furthermore, it is preferred if the tensioning apparatus is locked in the case of a predefined bend and/or twist of the dynamically acting element.

The above-stated description of advantageous refinements of the invention contains numerous features which are reproduced in the individual subclaims partially in a manner which is combined to form several said features. The features can expediently also be considered individually, however, and can be combined to form appropriate further combinations. In particular, the features can be combined in each case individually and in any desired suitable combination with the tensioning apparatus according to the invention and the use according to the invention. Thus, method features are also to be considered to be worded objectively as a property of the corresponding apparatus unit, and vice versa.

Even if terms are used in each case in the singular or in conjunction with a numeral in the description and/or in the patent claims, the scope of the invention for the terms is not to be restricted to the singular or the respective numeral.

The above-described properties, features and advantages of the invention and the way that they are achieved will become clearer and more readily comprehensible in conjunction with the following description of the exemplary embodiments which will be described in greater detail in conjunction with the drawings. The exemplary embodiments serve to describe the invention and do not restrict the invention to the combination of features which is specified therein, not even in relation to functional features. Moreover, to this end, suitable features of each exemplary embodiment can also be considered explicitly on their own, removed from an exemplary embodiment, introduced into another exemplary embodiment in order to supplement it, and combined with any desired one of the claims.

Other features which are considered as characteristic for the invention are set forth in the appended claims.

Although the invention is illustrated and described herein as embodied in a tensioning apparatus for straps, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
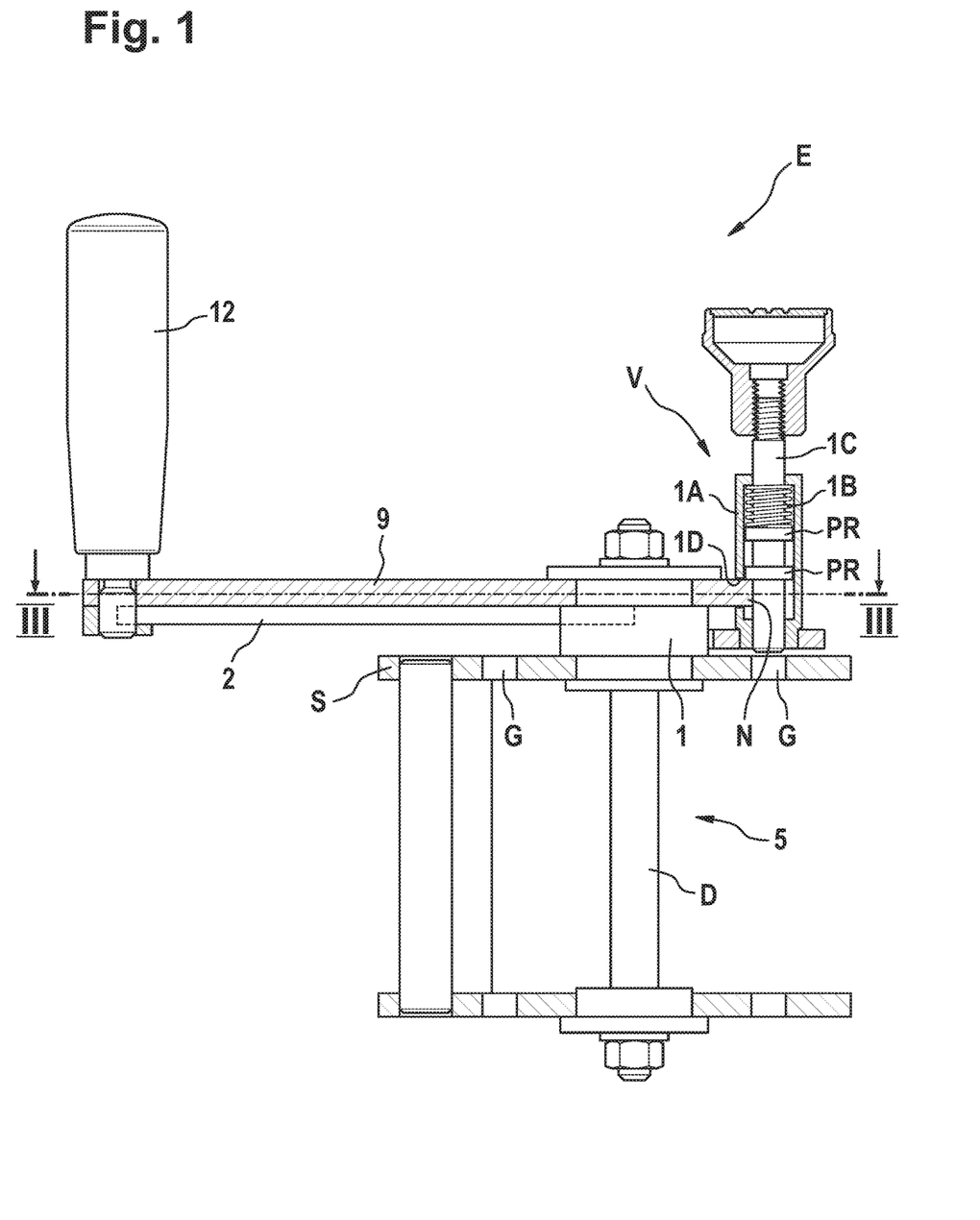
FIG. 1 is a diagrammatic, side, sectional view of a tensioning apparatus for straps in its unlocked state according to the invention.

Referring now to the figures of the drawings in detail and first, particularly to FIG. 1 thereof, there is shown diagrammatically a tensioning apparatus E for straps in a sectional illustration. In this example, the tensioning apparatus E is configured as a tensioning apparatus E for a belt (belt tensioning apparatus for short). The tensioning apparatus can also be suitable for tensioning any desired strap (instead of the strap which is configured here as a belt (also called a belt strap)).

The tensioning apparatus E contains a coupling 1 and a rotational element 5 which is connected to the coupling 1. In this example, the rotational element 5 has two rod-shaped elements D. In this example, the rod-shaped elements D are configured as bolts, in particular as connecting bolts. The two rod-shaped elements D can be rotated about one another. The rotational element 5 can in principle also be of different configuration.

The coupling 1 and the rotational element 5 are inserted into a clasp S of the tensioning apparatus E.

When a force is transmitted to the coupling 1, the rotational element 5 is rotated (under certain conditions, in particular in the case of a sufficient force). With the use of the rotational movement, a belt which bears at least against the rotational element 5, in particular a belt which is guided through the rotational element 5, can be tensioned (not shown, cf. FIG. 6). That is to say, a belt can be tensioned on account of the rotational movement of the rotational element 5. The rotational movement of the rotational element 5 is a rotational movement about its own axis, that is to say a rotation about its own axis.

When the rotational element 5 is rotated, it is rotated with respect to a clasp S. That is to say, the rotational movement of the rotational element 5 is a rotational movement with respect to the clasp S.

When the rotational element 5 is rotated, the rod-shaped elements D which are configured as bolts are rotated about one another in this example. On account of the rotational movement of the rotational element 5, the abovementioned belt can be wound around the rod-shaped elements D which are configured as bolts.

Furthermore, the tensioning apparatus E contains a dynamically acting element 2. The transmission of force in the case of the tensioning apparatus E takes place indirectly by means of the dynamically acting element 2.

In particular, the tensioning apparatus E is set up to transmit the force indirectly via the dynamically acting element 2 to the coupling 1, with the result that the rotational element 5 is rotated in order to tension a belt.

That is to say, when a force is exerted by a user, the force is transmitted indirectly via the dynamically acting element 2 to the coupling 1.

Figure 7:
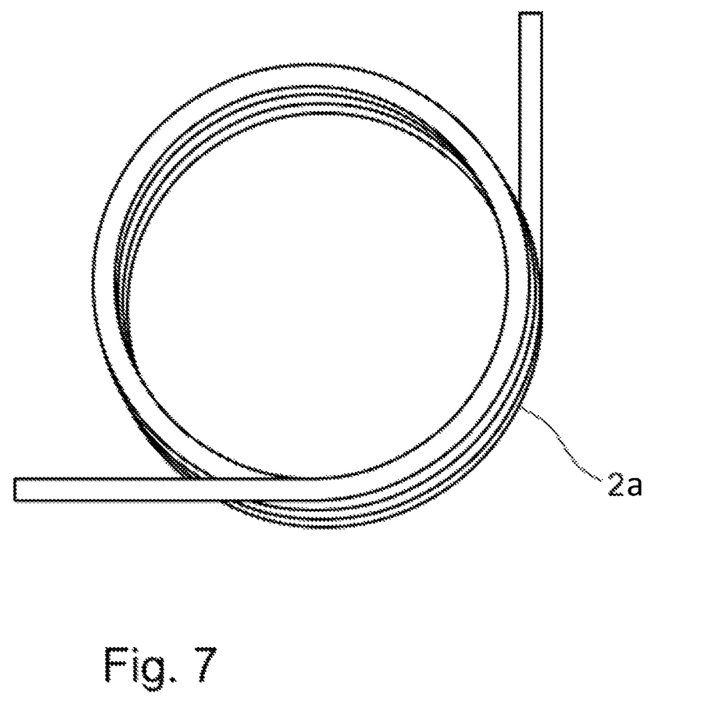
FIG. 7 schematically shows a dynamically acting element in the form of a torsion spring.

In this exemplary embodiment, the dynamically acting element 2 is a spring rod. The dynamically acting element 2 might also be a leg spring, a torsion spring 2a as shown in FIG. 7, a torsion element or the like.

In this example, the dynamically acting element 2 can be bent under the transmission of force. In principle, the dynamically acting element 2 might also be capable of being twisted.

In particular, the dynamically acting element 2 has a force-dependent bend.

If the dynamically acting element 2 does not transmit a force, it is not bent, that is to say its bend is zero. The higher the force which the dynamically acting element 2 transmits, the more the dynamically acting element 2 is bent, that is to say the higher is the bend.

The tensioning apparatus E contains a tensioning lever 9. In the case of the indirect transmission of force by the dynamically acting element 2, the tensioning lever 9 is in neutral.

In neutral, the tensioning lever 9 is not coupled to the coupling 1. In particular, the tensioning lever 9 is mounted such that it can be rotated about the coupling 1 in neutral, without transmitting a force to the coupling 1. In this way, an indirect transmission of force by the dynamically acting element 2 can be ensured. In this way, furthermore, a direct transmission of force by means of the tensioning lever 9 can be avoided.

Moreover, the tensioning apparatus E contains a crank 12. The user can exert force on the crank 12. In particular, the user can rotate the crank 12 about the coupling 1.

The crank 12 is connected to the dynamically acting element 2. Moreover, the crank 12 is connected to the tensioning lever 9. The crank 12 might in principle also be regarded as part of the tensioning lever 9.

By means of the crank 12, a force which is exerted by the user can be transmitted to the dynamically acting element 2 and to the tensioning lever 9.

Moreover, the tensioning apparatus E contains a locking mechanism V. By means of the locking mechanism V, the tensioning apparatus E can be moved from an unlocked, that is to say unblocked, state into a locked state ("locking"). Furthermore, the tensioning apparatus E can be moved by means of the locking mechanism V from the locked state into the unblocked state ("unlocking").

The locking takes place automatically/autonomously, in particular without a manual actuation of the locking mechanism V. The unlocking takes place manually.

The locking mechanism V is set up to lock the tensioning apparatus E in a manner which is dependent on the force which is transmitted by the dynamically acting element 2. That is to say, the locking mechanism V acts in a force-dependent manner. In particular, the locking mechanism V is set up to lock the tensioning apparatus E in the case of a predefined bend of the dynamically acting element 2.

When the force which is transmitted by the dynamically acting element 2 assumes a predefined value, the bend of the dynamically acting element 2 corresponds to the predefined bend, and the locking mechanism V then locks the tensioning apparatus E.

The locking point (that is to say, the force to be applied and/or the predefined bend, in the case of which the locking mechanism V locks) can be specified structurally and/or can be capable of being set mechanically.

The locking mechanism V contains a locking bolt 1C and a compression spring 1B. In this exemplary embodiment, the locking mechanism V contains two locking steps (cf. FIG. 4 and FIG. 5). The locking takes place in a stepped manner with the use of the locking steps.

The coupling 1 has a guide tube 1A. The locking bolt 1C is situated in the guide tube 1A of the coupling 1. The locking bolt 1C is pressed by way of the compression spring 1B in the direction of the clasp S and/or against the clasp S of the tensioning apparatus E. The locking bolt 1C has at least one (here, two) position ring/rings PR.

Figure 2:
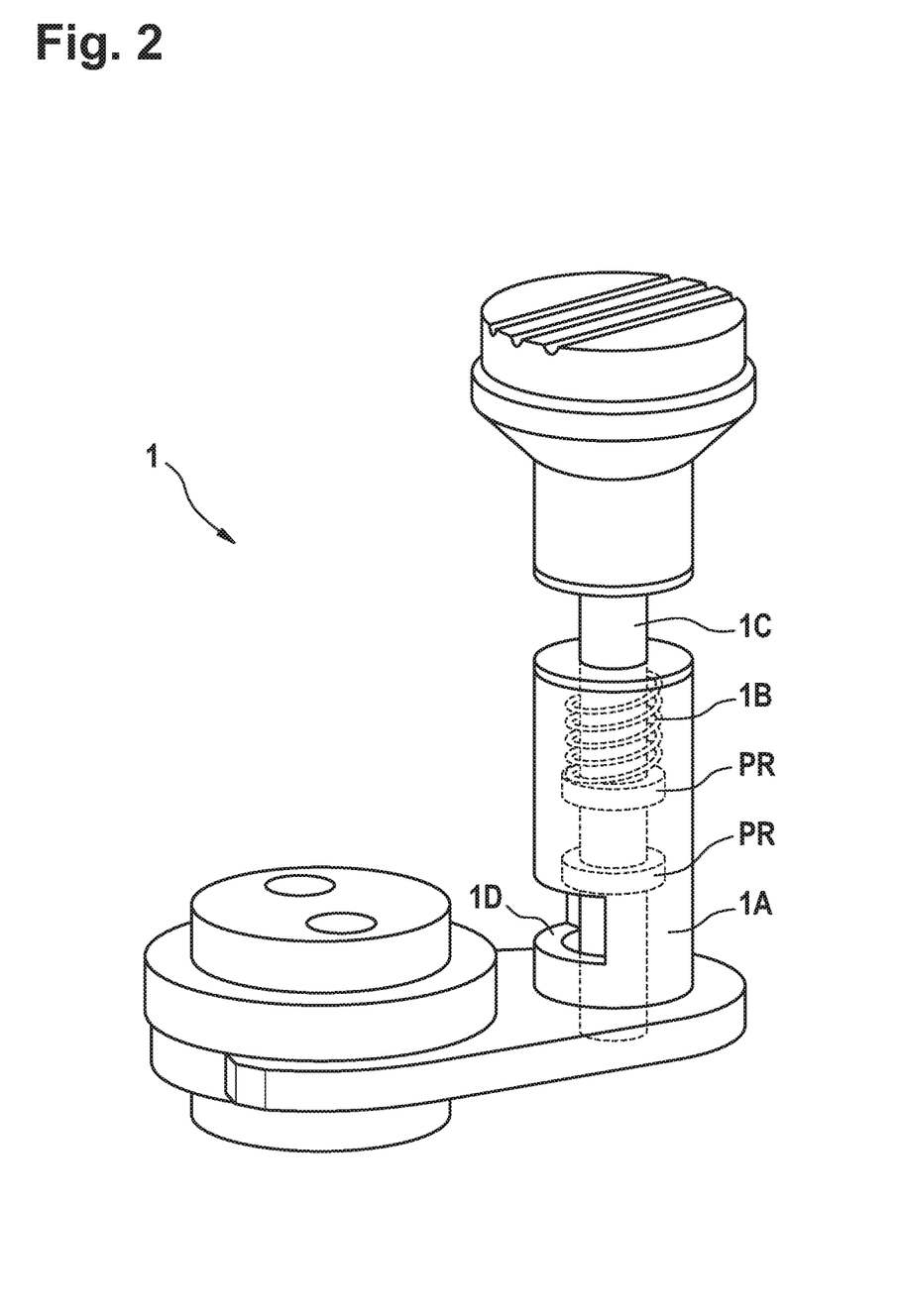
FIG. 2 is a perspective view of a coupling and a locking bolt of the tensioning apparatus from FIG. 1.

FIG. 2 shows the coupling 1 and the locking bolt 1C from FIG. 1 in a three-dimensional view.

The guide tube 1A has a cutout 1D (cf. FIG. 1, FIG. 2).

Figure 3:
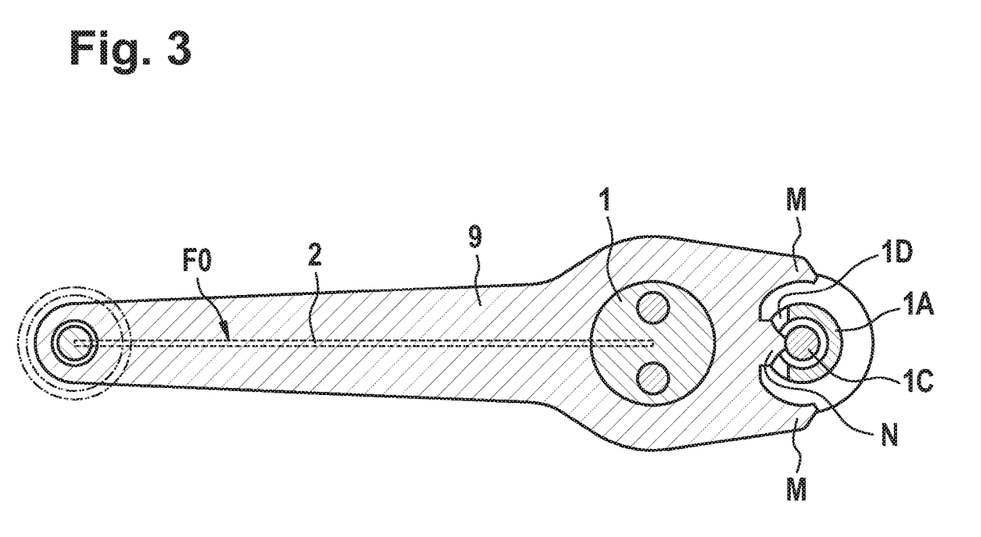
FIG. 3 is a sectional view of a tensioning lever and a dynamically acting element of the tensioning apparatus from FIG. 1 in a non-loaded state.

The tensioning lever 9 has a lug N (cf. FIG. 1, FIG. 3). Moreover, the tensioning lever 9 has laterally arranged driving pawls M (cf. FIG. 3).

Furthermore, the clasp S has at least one (here, a plurality of) locking bore/bores G.

FIG. 1 shows the unlocked state of the locking mechanism V. That is to say, the tensioning apparatus is unlocked in FIG. 2.

The lug N of the tensioning lever 9 protrudes into a cutout 1D of the guide tube 1A.

In the unlocked (that is to say, non-blocked) state, the locking bolt 1C is held in the pulled (non-blocked) state on one of its two position rings PR by way of the lug N of the tensioning lever 9.

In particular, in the non-blocked state, one of the position rings PR of the locking bolt 1C (here, the lower position ring PR in accordance with the drawing) bears against the lug N of the tensioning lever 9 and is pressed against the lug N. That is to say, the lug N of the tensioning lever 9 protrudes into the cutout 1D of the guide tube 1A in such a way that one of the position rings PR (here, the lower position ring PR) of the locking bolt 1C is pressed against the lug N.

In this way, latching of the locking bolt 1C into the clasp S and therefore locking can be prevented.

In the case of the tensioning apparatus E in the unlocked state, that is say up to the locking of the tensioning apparatus E, the transmission of force takes place by means of the dynamically acting element 2.

A belt C can be inserted into the tensioning apparatus E. In particular, the belt C can be inserted into the tensioning apparatus E in such a way that the belt C bears at least against the rotational element 5 of the tensioning apparatus E (not shown, cf. FIG. 6). For example, the belt C can be inserted into the tensioning apparatus E in such a way that the belt C is guided through the rotational element 5, in particular between the two rod-shaped elements D of the rotational element 5.

Moreover, a sectional plane III-III is illustrated in FIG. 1.

FIG. 3 shows the tensioning lever 9 and the coupling 1 from FIG. 1 as a sectional illustration along the sectional plane III-III. Although the dynamically acting element 2 is concealed by the tensioning lever 9, its position is indicated in FIG. 3.

The tensioning lever 9 and the dynamically acting element 2 is situated in a non-loaded state without a transmission of force (state "F0").

Since the dynamically acting element 2 does not transmit any force, it is not bent, that is to say its bend is zero. The dynamic element 2 is therefore in its starting state.

The tensioning lever 9 is mounted without a form locking connection and without a force locking connection such that it can be rotated about the center of the coupling 1. In particular, the driving pawls M of the tensioning lever 9 are arranged spaced apart from the guide tube 1A. A form-locking connection is one that connects two elements together due to the shape of the elements themselves, as opposed to a force-locking connection, which locks the elements together by force external to the elements.

In particular, the tensioning lever 9 is mounted such that it can be rotated about the center of the coupling 1 until it bears against one of the two driving pawls M without a form locking or a force locking connection.

Starting from the non-blocked state in FIG. 1, the dynamically acting element 2 holds the tensioning lever 9 in the center of the coupling 1 in the non-loaded state F0 (see FIG. 3), and the lug N fixes the locking bolt 1C ("non-blocked state", cf. FIG. 1) here.

When, starting from the non-loaded state F0 (FIG. 3), a user rotates the crank 12, he/she exerts a force on the crank 12. The force which is exerted by the user is transmitted to the dynamically acting element 2 and to the tensioning lever 9. In this way, both the dynamically acting element 2 and the tensioning lever 9 are rotated around the coupling.

Since the tensioning lever is in neutral, the tensioning lever does not transmit any force to the coupling 1. The force which is exerted by the user is transmitted to the coupling 1 via the dynamically acting element 2 which is configured as a spring rod, that is to say indirectly. The coupling 1 and its guide tube 1A are rotated in this way.

If a belt C is inserted into the tensioning apparatus E, the belt C begins to be tensioned.

The force is transmitted indirectly via the dynamically acting element 2 to the coupling 1 of the tensioning apparatus E, with the result that the rotational element 5 which is connected to the coupling 1 is rotated. The strap C is tensioned in the case of the rotational movement of the rotational element 5.

In the case of an increasing tension of the belt C, the user has to increase the force which is applied. Since the force which is generated by the user increases in the case of an increasing tension of the belt C, the force which is transmitted by way of the dynamically acting element 2 which is configured as a spring rod also increases. This leads to continuous force-dependent bending of the dynamically acting element 2 which is configured as a spring rod. That is to say, the dynamically acting element 2 is bent in a manner which is dependent on the force which acts on the element 2.

The higher the force which the dynamically acting element 2 transmits, the more the dynamically acting element 2 is bent, that is to say the higher is the bend.

In the case of the structurally specified maximum bending angle being reached, that is to say in the case of the structurally specified maximum bend being reached, the maximum force which can be transmitted by way of the dynamically acting element 2 which is configured as a spring rod is reached (state "F+"). Therefore, a minimum envisaged belt tension which is linked to the state F+ is reached.

Figure 4:
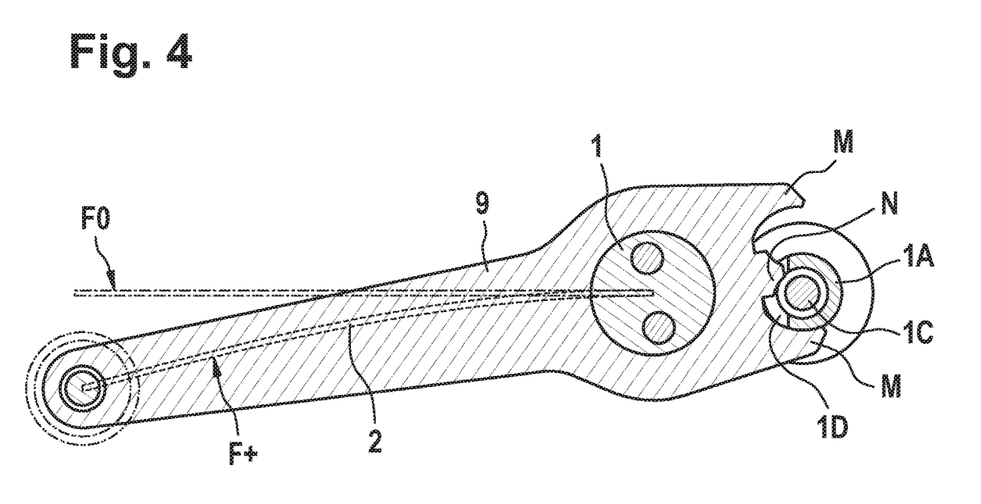
FIG. 4 is a sectional view of the tensioning lever and the dynamically acting element from FIG. 3 in a state of a maximum transmission of force.

FIG. 4 shows the tensioning lever 9 and the coupling 1 from FIG. 3 in the state of the maximum transmission of force (state F+). The position of the dynamically acting element 2 in the state F+ can also be seen in FIG. 4. For comparison, moreover, the position of the dynamically acting element 2 in the state F0 is indicated using dashed lines in FIG. 4.

The tensioning apparatus E is locked in the case of a predefined bend of the dynamically acting element 2, namely in the case of the structurally specified maximum bending angle being reached (state "F+"). Here, the locking takes place in a stepped manner in two locking steps.

The first locking step is reached in the case of the state F+ being reached.

In the state F+, that is to say in the case of the minimum envisaged belt tension being reached at the point F+, the tensioning lever 9 is disengaged to such an extent that the lug N of the tensioning lever 9 releases the lower (in accordance with the drawing) position ring PR of the locking bolt 1C, and the locking bolt 1C is pressed against the clasp S by way of the compression spring 1B.

When the locking bolt 1C is pressed against the clasp S, the locking mechanism V is situated in its first locking step.

In the case of the state F+ being reached, no locking bore G is as a rule positioned in such a way that the locking bolt 1C might engage/latch directly into said locking bore G.

In the state F+, the tensioning lever 9 is positioned in such a way that one of the driving pawls M bears against the guide tube 1A. In this way, the tensioning lever 9 is positioned in the state F+ in such a way that the tensioning lever 9 establishes a form locking transmission of force.

The force which is exerted by a user in the state F+ is transmitted directly via the tensioning lever 9 in a form locking manner to the coupling 1. In particular, in the state F+, the force which is exerted by a user is transmitted to the guide tube 1A of the coupling 1 via the driving pawls M of the tensioning lever 9 which bear against the guide tube 1A.

Starting from the state F+ (FIG. 4), the force which is exerted by the user brings about a rotation of the rotational element D, with the result that a strap C which is inserted into the tensioning apparatus E can be tensioned further.

Starting from the state F+ (FIG. 4), that is to say after the point F+ is reached, further tensioning of the belt takes place by way of a form locking transmission of force via the driving pawl M until the locking bolt 1C latches into one of the locking bores G on the clasp S. In this way, form locking blocking of the tensioning apparatus E is achieved.

On account of the further tensioning of the belt starting from the state F+, the maximum belt tension lies higher than the belt tension which is achieved in the case of the point F+.

The envisaged belt tensioning range can be influenced structurally, for example, by way of a diameter of the spring rod, a length of the spring rod and/or a division of the locking bores G (smaller hole spacing results in a smaller tolerance range between the minimum and the maximum belt tension). Furthermore, the length of the spring rod can be capable of being set by way of the user, which makes an individually selectable belt tension range possible.

Figure 5:
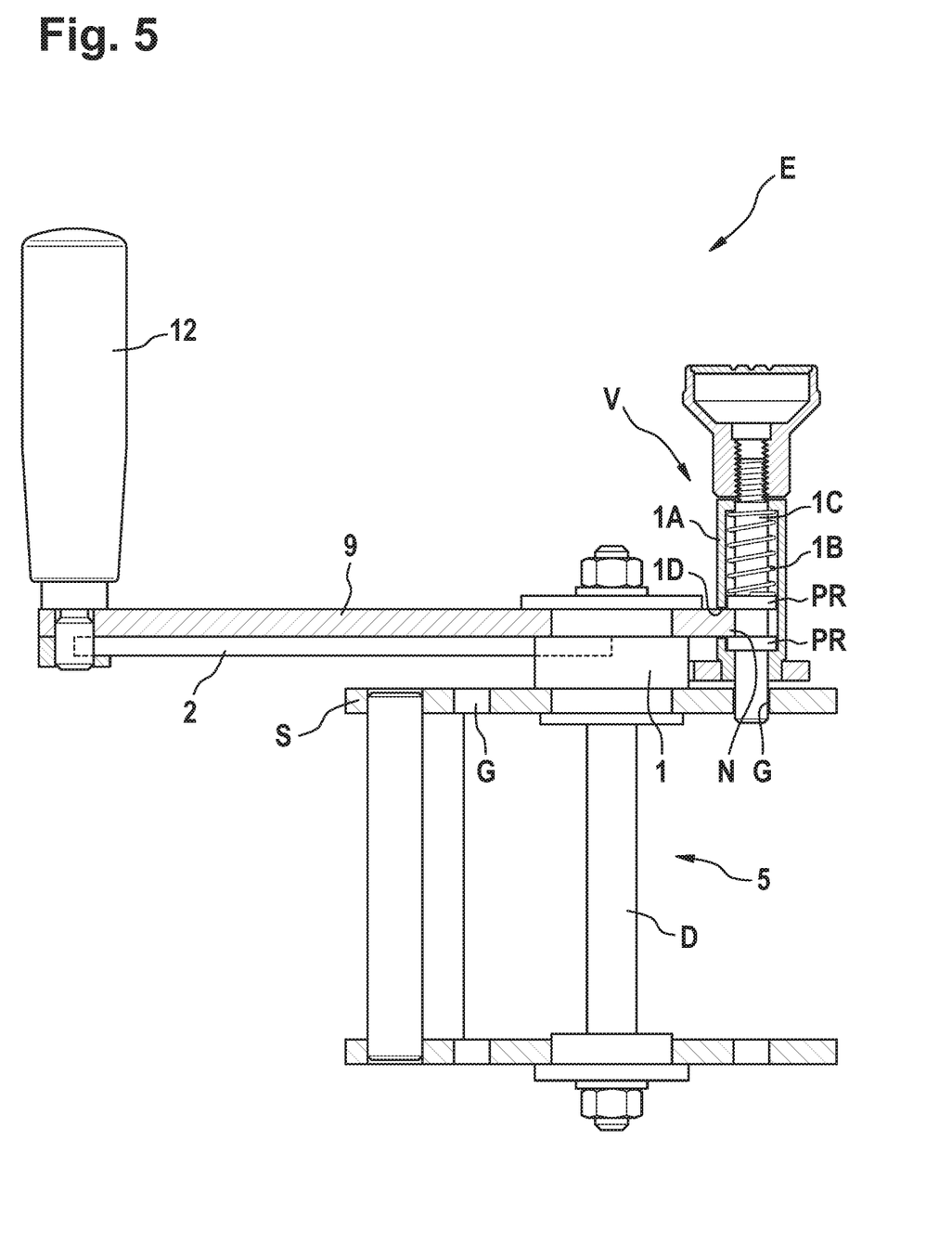
FIG. 5 is a side, sectional view of the tensioning apparatus from FIG. 1 in its locked state.

When the locking bolt 1C latches into one of the locking bores G on the clasp S, the second locking step is achieved. That is to say, the tensioning apparatus E is blocked in a interlocking manner in the second locking step.

A form or interlocking connection between the coupling 1 and the clasp S is produced by way of the latching of the locking bolt 1C in the clasp S. Further tensioning by way of the user is then no longer possible.

If, in the case of the state F+ being reached, one of the locking bores G is positioned in such a way that the locking bolt 1C can engage/latch directly into the locking bore G, the locking mechanism V can pass directly from the first locking step into the second locking step, without further tensioning of the belt C being necessary.

FIG. 5 shows the tensioning apparatus E from FIG. 1 in its locked state, the locking mechanism V being situated in its second locking step.

After ending of the tensioning operation, the introduction of force by way of the user ends, and the dynamically acting element 2 which is configured as a spring rod resets the tensioning lever 9 back to the original position at point F0 (cf. FIG. 3) from the position of the point F+ (FIG. 4) on account of the spring action of said dynamically acting element 2.

Since, in the second locking step of the locking mechanism V, the locking bolt 1C engages into one of the locking bores G of the clasp S, the locking bolt 1C is then positioned in such a way that the lug N of the tensioning lever 9 can engage between the two position rings PR of the locking bolt 1C.

In the position, the locking bolt 1C is blocked against being pulled out (releasing of the tensioning apparatus) by way of one of its two position rings PR (here, the lower (in accordance with the drawing) position ring PR) and the lug N of the tensioning lever 9.

In this way, the locking mechanism V is secured in the second locking step. In this way, in particular, the locking bolt 1C is fixed in the second locking step.

FIG. 5 shows the second locking step of the locking mechanism V in the secured state.

Releasing of the locking bolt 1C, that is to say unblocking of the tensioning apparatus E, is possible by way of the user only after a predefined sequence. In this way, accidental unblocking can be avoided. In particular, random or undesired releasing is therefore ruled out.

Releasing of the locking bolt 1C, that is to say unblocking of the tensioning apparatus E, is possible by means of a two-handed positive releasing operation starting from the second locking step in the secured state (FIG. 5).

For releasing, the tensioning lever 9 is to be moved at least to the position of the point F+ by way of the user. In the case of the point F+ being reached, the lug N of the tensioning lever 9 is disengaged again to such an extent that the locking bolt 1C can be pulled by hand out of the clasp S in an unimpeded manner.

In the case of the tensioning lever 9 being turned backward with a simultaneously pulled locking bolt 1C, the lug N of the tensioning lever 9 returns into its basic position F0 due to the force of the dynamically acting element 2. Here, the locking bolt 1C is then held in the pulled (unblocked) state again on one of the position rings PR (here, the lower position ring PR) by way of the lug N of the tensioning lever 9, and the belt C can be relieved completely in an unimpeded manner by way of further turning backward of the tensioning lever 9.

Figure 6:
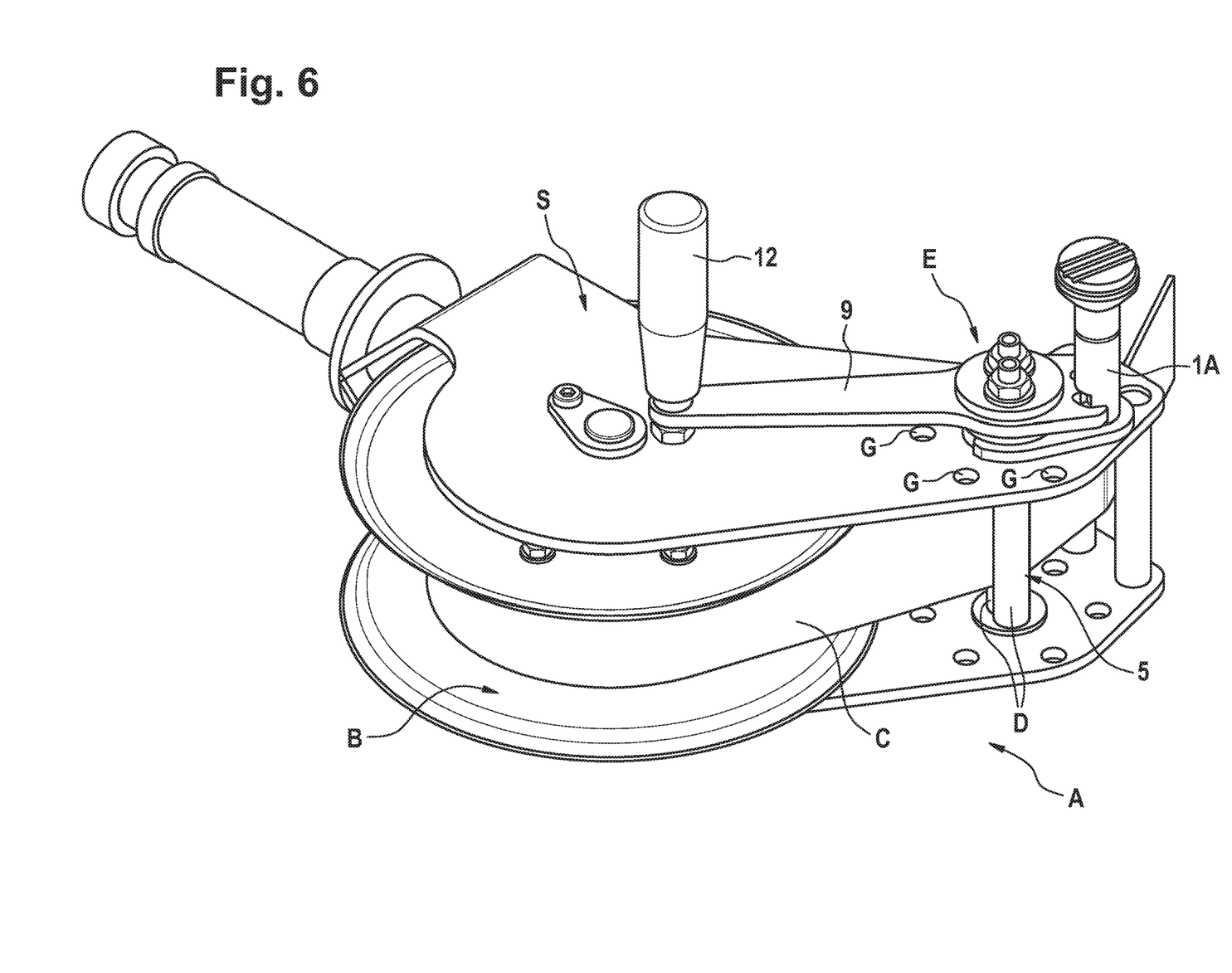
FIG. 6 is a diagrammatic, perspective view of a tensioning system with the tensioning apparatus from FIG. 1, a belt being inserted into the tensioning system.

FIG. 6 diagrammatically shows a tensioning system A having the tensioning apparatus E from FIG. 1 which is configured as a belt tensioning apparatus. The tensioning system A is shown in a three-dimensional manner. In this example, a belt C is inserted into the tensioning system A, and therefore also into the tensioning apparatus E.

In this example, the tensioning system A is a tensioning system A which is fastened in a stationary manner and can be rotated by 180°. In this example, the clasp S is configured as a rotatable clasp S.

The tensioning system A contains an automatic belt retracting means B. The clasp S serves to fasten the roller for the automatic belt retracting means B. That is to say, the automatic belt retracting means B is fastened in the clasp S. A prestressed torsion spring (not shown) is situated in the interior region of the belt retracting means B.

The torsion spring is additionally stressed further in the case of the belt C being pulled out. In the case of the release of the tensioning apparatus E, the torsion spring winds the belt C onto the roller of the belt retracting means B again.

Here, the tensioning apparatus E undertakes the actual tensioning and securing of the belt C.

The belt C bears at least against the rotational element 5 of the tensioning apparatus E. In this example, the belt C is guided through the rotational element 5. In particular, the belt C is guided through between the two rod-shaped elements D of the rotational element 5 which are configured as bolts.

By way of the rotation of the crank 12 of the tensioning apparatus E, the force which is exerted by the user is transmitted to the coupling 1 of the tensioning apparatus E, with the result that the rotational element 5 which is connected to the coupling 1 is rotated. On account of the rotational movement, the belt C is wound up by the rotational element 5, in particular by the rod-shaped elements D of the rotational element 5. That is to say, the belt C is wound up by way of the rotation of the crank 12 of the tensioning apparatus E.

The winding up of the belt C leads as far as the force-dependent locking of the tensioning apparatus E to continuous tautening of the belt C, that is to say to tensioning of the belt C.

The force-dependent tensioning apparatus E which is configured as a belt tensioning apparatus can also be used in other systems than the above-described tensioning system A. Possible examples of systems of this type are stationary and temporary safety barriers, cargo securing means which are integrated into vehicles and/or loose tensioning systems without a belt retracting means. The tensioning apparatus E can also be used in a tensioning system in an area with high safety requirements, such as for personal security.

In summary, the following is noted.

The invention relates to a tensioning apparatus for straps, in particular for belts C, preferably having: (i) a rotational element 5 which can be set up, in particular, for winding up a strap; (ii) a clasp S which can be set up, in particular, for carrying the rotational element 5; (iii) a tensioning lever 9 which can be set up, in particular, for rotating the rotational element 5 relative to the clasp S; (iv) a coupling 1 which can be set up, in particular, for coupling the tensioning lever 9 to the rotational element 5, the coupling 1 and the tensioning lever 9 preferably being mounted such that they can be pivoted relative to one another about the same rotational axis; and (v) a dynamically acting element 2 which can be set up, in particular, for transmitting a force from the tensioning lever 9 to the coupling 1 in a first operating state of the tensioning apparatus, in particular when the tensioning apparatus is not locked, the tensioning lever 9 preferably having at least one driving pawl M which can be set up, in particular, for transmitting a force from the tensioning lever 9 to the coupling 1 in a second operating state of the tensioning apparatus, in particular in the first and/or second locking step.

Here, the coupling 1 is preferably connected fixedly to the rotational element 5 so as to rotate with it. Therefore, the rotational element 5 can also be mounted such that it can be rotated about the rotational axis, about which the tensioning lever 9 and the coupling 1 are mounted rotatably.

Here, a fixed connection so as to rotate together is preferably to be understood to mean a connection which prevents pivoting of the rotational element 5 relative to the clutch 1. The fixed connection so as to rotate together can be a form locking, integrally joined and/or force-locking connection. The coupling 1 and the rotation element 5 can be interlocked, welded and/or screwed to one another, for example.

The dynamically acting element 2 is preferably a flexible element 2 which can be set up, for example, for deforming, for instance for bending or for twisting, under the action of force, in particular in the case of the transmission of a force from the tensioning lever 9 to the coupling 1 in the first operating mode. The dynamically acting or flexible element 2 is preferably set up, in particular arranged, for coupling the tensioning lever 9 to the coupling 1.

In the second operating mode of the tensioning apparatus, the driving pawl M of the coupling 1 is preferably set up for the direct, in particular interlocking, transmission of a force from the tensioning lever 9 to the coupling 1. The driving pawl M can be set up, in particular, for bearing against or coming into contact with the coupling 1, in particular against/with the guide tube 1A of the coupling 1, in a preferably interlocking manner.

As can be seen in FIG. 3 and FIG. 4, the dynamically acting or flexible element 2 couples the tensioning lever 9 and the coupling 1 here in such a way that pivoting of the tensioning lever 9 in the first operating mode, for example when the tensioning apparatus is not locked, in particular when the lug of the tensioning lever 9 has not yet released the locking bolt 1C of the locking mechanism V, likewise brings about pivoting of the coupling 1 and preferably also of the rotational element 5 which is connected to the coupling 1 (cf. FIG. 1).

Here, the pivoting of the tensioning lever 9 brings about the pivoting of the coupling 1 at least for as long as a predefined force threshold value is not reached or exceeded, that is to say for as long as the lug of the tensioning lever 9 has not yet released the locking bolt 1C.

The pivoting can be, in particular, "asynchronous" pivoting, in the case of which the tensioning lever 9 is pivoted by a greater angular range than the coupling 1, that is to say the tensioning lever 9 and the coupling 1 also being pivoted relative to one another. Therefore, in particular in the first operating mode of the tensioning apparatus, an "indirect" transmission of force can also be referred to.

The reason for the "asynchronous" pivoting and/or "indirect" transmission of force is that the dynamically acting or flexible element 2 is preferably set up for absorbing a part of the force which acts on the tensioning lever 9 for the purpose of the rotation of the rotational element 5, for example by way of deformation, for instance by way of bending or twisting. Here, the relative pivoting of the tensioning lever 9 and the coupling 1 can be dependent, in particular, on the tension of the strap which is to be wound up or unwound.

An indirect transmission of force is therefore preferably to be understood to mean a transmission of at least part of a force which acts on the tensioning apparatus, in particular on the tensioning lever, to the coupling 1 in the case of simultaneous deformation of the dynamically acting or flexible element 2.

If the tension of the strap to be wound up or unwound reaches or exceeds a predefined tension threshold value, the deformation of the dynamically acting or flexible element 2 is preferably so great that the at least one driving pawl M of the tensioning lever 9 bears against the coupling 1, in particular against the guide tube 1A of the coupling 1. As a result, further pivoting of the tensioning lever 9 can bring about "synchronous" pivoting of the coupling 1, that is to say driving of the coupling 1. In other words, a force which acts on the tensioning apparatus, in particular on the tensioning lever 9, can then be transmitted directly and completely to the coupling 1.

Here, at the same time, the lug N of the tensioning lever 9 releases the locking bolt 1C of the locking mechanism V, with the result that the locking bolt 1C can latch into one of the locking bores G in the case of a further rotation of the tensioning lever 9 and/or the coupling 1.

Although the invention has been illustrated and described more specifically in detail by way of the preferred exemplary embodiments, the invention is not restricted by way of the disclosed examples, and other variations can be derived herefrom by a person skilled in the art without departing from the scope of protection of the invention.

LIST OF DESIGNATIONS

1 Coupling
1A Guide tube
1B Compression spring
1C Locking bolt
1D Cutout
2 Dynamically acting element
5 Rotational element
9 Tensioning lever
12 Crank
A Tensioning system
B Belt retracting means
C Belt
D Rod-shaped element, in particular bolt
E Tensioning apparatus
F0 Unloaded state
F+ State of maximum force transmission
G Locking bore
N Lug
M Driving pawl
PR Position ring
S Clasp
V Locking mechanism

The invention claimed is:

1. A tensioning apparatus for straps, in particular for belts, comprising:
 a rotational element configured for winding up a strap;
 a clasp configured for carrying said rotational element;
 a tensioning lever configured for rotating said rotational element relative to said clasp;
 a coupling configured for coupling said tensioning lever to said rotational element, said coupling and said tensioning lever being mounted such that they can be pivoted relative to one another about the same rotational axis;
 a dynamically acting element configured to transmit a force from said tensioning lever to said coupling in a first operating mode of said tensioning apparatus, wherein in the first operating mode, user-generated force for tensioning a belt is transmitted only by the dynamically acting element; and
 said tensioning lever including at least one driving pawl configured for transmitting the force from said tensioning lever to said coupling in a second operating mode of said tensioning apparatus, wherein in the second operating mode, user-generated force for tensioning the belt is transmitted only by the pawl.

2. The tensioning apparatus according to claim 1, wherein said rotational element is connected to said coupling, the tensioning apparatus is set up to transmit the force indirectly via said dynamically acting element to said coupling, with a result that said rotational element is rotated.

3. The tensioning apparatus according to claim 1, wherein said dynamically acting element bends and/or twists when indirectly transmitting the force exerted by a user.

4. The tensioning apparatus according to claim 1, wherein a degree of bend and/or twist of said dynamically acting element depends on a force acting on the dynamically acting element.

5. The tensioning apparatus according to claim 4, further comprising a locking mechanism set up to lock the tensioning apparatus in a case of a predefined bend and/or twist of said dynamically acting element.

6. The tensioning apparatus according to claim 5, wherein the tensioning apparatus is configured to allow the indirect transmission of the force exerted by a user via the dynamically acting elements until the tensioning apparatus is locked by the locking mechanism.

7. The tensioning apparatus according to claim 5, wherein said locking mechanism for locking the tensioning apparatus has a locking step which is set up for blocking the tensioning apparatus in an interlocking manner.

8. The tensioning apparatus according to claim 1, wherein said tensioning lever is in neutral in a case of an indirect transmission of force by said dynamically acting element.

9. The tensioning apparatus according to claim 5, wherein said locking mechanism for locking the tensioning apparatus has two locking steps, and said tensioning lever is set up for an interlocking transmission of force between said two locking steps of said locking mechanism.

10. The tensioning apparatus according to claim 1, wherein said dynamically acting element is a spring rod.

11. The tensioning apparatus according to claim 1, wherein the tensioning apparatus is set up to transmit the force indirectly via said dynamically acting element to said coupling, with a result that the strap is tensioned.

12. A method of using a tensioning apparatus, which comprises the steps of:
 providing a tensioning apparatus according to claim 1;
 inserting a strap into the tensioning apparatus in such a way that the strap bears at least against a rotational element of the tensioning apparatus; and
 transmitting a force indirectly via the dynamically acting element to a coupling of the tensioning apparatus, with a result that the rotational element which is connected to a coupling is rotated, the strap being tensioned in a case of a rotational movement of the rotational element.

* * * * *